United States Patent [19]

Kaszas et al.

[11] Patent Number: 4,910,261

[45] Date of Patent: Mar. 20, 1990

[54] THERMOPLASTIC ELASTOMERS HAVING ISOBUTYLENE BLOCK AND CYCLIZED DIENE BLOCKS

[75] Inventors: Gabor Kaszas; Judit E. Puskas; Joseph P. Kennedy, all of Akron, Ohio

[73] Assignee: Edison Polymer Innovation Corp. (EPIC), Broadview Heights, Ohio

[21] Appl. No.: 208,374

[22] Filed: Jun. 17, 1988

[51] Int. Cl.$^4$ .......................................... C08F 297/00
[52] U.S. Cl. ................................. 525/314; 525/319; 525/270; 525/332.3; 525/371; 522/126
[58] Field of Search ......................................... 525/314

[56] References Cited

U.S. PATENT DOCUMENTS

| | | | |
|---|---|---|---|
| 4,248,986 | 2/1981 | Lai et al. ............................. | 525/371 |
| 4,480,075 | 10/1984 | Willis .................................. | 525/314 |
| 4,631,249 | 12/1986 | Kalyanaraman ..................... | 430/330 |
| 4,782,122 | 11/1988 | Dean .................................. | 525/375 |

FOREIGN PATENT DOCUMENTS 838996  6/1960  United Kingdom ................ 525/314

*Primary Examiner*—Wilbert J. Briggs, Sr.
*Attorney, Agent, or Firm*—Oldham & Oldham Co.

[57] ABSTRACT

A polymerization process for preparing triblock copolymers and multiblock copolymers. The process includes the polymerization of isobutylene below about $-40°$ C. in a reaction mixture which includes a titanium halide, a mixed solvent, and an initiator compound selected from the group consisting of cumyl ester and cumyl ether compounds. In at least some instances, the components are added in a particular order, sometimes together with a moisture scavenger. After formation of the polyisobutylene, a diene is added to the mixture containing the polyisobutylene and polymerized to form the desired copolymer. The diene portion of the copolymer may subsequently be cyclized to produce a copolymer exhibiting both thermoplastic and elastomeric properties. If desired the block copolymers can be subsequently modified to include functional side groups, or to provide photocuring capabilities.

3 Claims, No Drawings

THERMOPLASTIC ELASTOMERS HAVING ISOBUTYLENE BLOCK AND CYCLIZED DIENE BLOCKS

TECHNICAL FIELD

This invention relates to block copolymers. More particularly, this invention relates to block copolymers, including thermoplastic, elastomeric polymers having a central portion which exhibits rubbery properties, and end portions which possess a glassy character. Specifically, this invention relates to block copolymers, including photo-sensitive block copolymers and block copolymers with reactive side groups, and especially to thermoplastic, elastomeric products prepared by carbocationic polymerization involving an initial homopolymerization of a monomer to form a polymer capable of conferring elastomeric properties on an ultimate copolymer product. The homopolymerization is followed by the subseqeent addition of a monomer capable of forming endblock polymer segments which confer glassy properties on the ultimate copolymer product, and the copolymerization of the latter monomer with the homopolymer to form a block copolymer which may then be cyclized to form an ultimate product exhibiting both elastomeric and thermoplastic properties.

BACKGROUND OF THE INVENTION

Polymeric materials exhibiting both thermoplastic, as well as elastomeric characteristics have a variety of unique properties which makes such materials valuable articles of commerce. Such thermoplastic elastomers are block copolymers having the general structure of ABA, or $A(BA)_n$ where A is a thermoplastic, glassy block segment with a high glass transition temperature, while B is an elastomeric block. The copolymers behave like vulcanized rubbers at room temperature, and like thermoplastic polymers at higher temperatures. Thus, the materials can be melt extruded like plastics, while retaining their beneficial rubbery features upon cooling. This ability is not only of advantage during processing of the polymers, but allows the materials to be reprocessed as occasion demands. Furthermore, not only are such products fundamentally elastomeric in nature, but they exhibit physical behaviors similar to elastomers which have been reinforced with reinforcing agents. In other words, the products behave physically substantially in the same manner as vulcanized rubbers, but without the need to subject them to vulcanization procedures, which is often impractical because of the nature of the product being produced, for example, adhesives, coatings, and elastic threads.

Polymers having such dual nature have been known for some time, one such product, for example, being that prepared by copolymerizing polystyrene with polybutadiene, sold under the trademark "Kraton" by Shell Oil Company. Other similar products are disclosed in U.S. Pat. No. 4,242,471, which involve the polymerization of various conjugated dienes with certain other compounds. While the latter products possess the desirable fundamental duality of properties described, unfortunately, they also possess certain undesirable characteristics. For example, their glass transition temperatures are in many cases undesirably low, in the neighborhood of from 80° C. to 90° C., limiting the temperature environment in which they can be used. In addition, the products possess an undesirably high degree of unsaturation in their central polymer block portion which makes them vulnerable to degradation resulting from oxidation resulting through exposure to air. While such degradation may be avoided by subjecting the products to techniques which saturate their double bonds, the additional processing entails undesirable expense.

SUMMARY OF THE INVENTION

A first aspect of the invention, therefore, is to provide a process for preparing block copolymers which exhibit both thermoplastic and elastomeric properties.

It is a second aspect of the invention, however, to prepare the elastomeric section of thermoplastic, elastomeric copolymers by living polymerizations employing multifunctional polymerization initiator systems.

A further aspect of this invention is to prepare thermoplastic elastomers whose elastomeric section is inherently saturated, and thus is less susceptible to oxidation.

An additional aspect of the invention is to provide ABA or $A(BA)_n$ polymer structures, where n is a positive whole number, which may then be cyclized to form thermoplastic elastomers, by means of a two-step, cationic polymerization.

Yet another aspect of the invention is to prepare thermoplastic elastomers which exhibit relatively high glass transition temperatures.

A still further aspect of the invention is to make available photo-curable thermoplastic elastomers.

Another aspect of this invention is to provide block copolymers in which the elastomeric portion has a relatively narrow molecular weight distribution.

Still another aspect of the invention is to provide copolymers which include desirable functional side groups therein.

The forgoing and other aspects of the invention, as will become apparent in the following disclosure of the invention, are provided by a polymerization process for preparing a block copolymer comprising the following steps carried out at a temperature below about −40° C. in the order decided, (1) polymerizing isobutylene in a reaction mixture including said isobutylene, a titanium halide, a mixed solvent, and an initiator compound selected from the group consisting of cumyl ester compounds and cumyl ether compounds, to form a first polymer, wherein when said temperature is from about −40° C. to −90° C., or when the initiator compound has more than one ester or ether linkage, said reaction mixture is formed by first combining said mixed solvent, said initiator, said isobutylene, and a moisture scavenger, and then adding said titanium halide, and wherein said mixed solvent comprises a mixture of a non-halogenated hydrocarbon solvent, with a halogenated hydrocarbon solvent and (2) after polymerizing said isobutylene, adding a conjugated diene monomer of the general formula

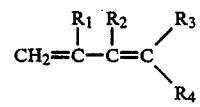

in which $R_1$ is selected from a hydrocarbyl group containing from one to twelve carbon atoms, and $R_2$, $R_3$, and $R_4$, are selected from hydrogen or a hydrocarbyl group containing from one to twelve carbon atoms, to said reaction mixture and polymerizing said diene to form a triblock copolymer in which said first polymer comprises the midblock, and the polymerized diene forms the endblocks of said block copolymer, or a multiblock copolymer in which said first polymer comprises an elastomeric segment flanked by blocks of the polymerized diene containing partially cyclized segments.

The foregoing and additional aspects of the invention are provided by a tri-block copolymer comprising a polyisobutylene midblock and polymerized diene endblocks, or a multiblock copolymer comprising a polyisobutylene elastomeric block flanked by blocks of the polymerized diene containing partially cyclized segments, wherein the ratio of weight average molecular weight, to number average molecular weight of said midblock is no more than about 1.5.

The foregoing and additional aspects of the invention are provided by block copolymers according to the preceding paragraph wherein said polymerized diene has been cyclized.

The foregoing and still additional aspects of the invention are provided by block copolymers of the penultimate paragraph which have been made photocurable by being mixed with a bis-azide.

The foregoing and still further aspects of the invention are provided by block copolymers wherein the ratio of weight average molecular weight to number average molecular weight of said midblock is no more than about 1.5, and wherein said block copolymers include functional side groups.

The foregoing and further aspects of the invention are provided by a triblock copolymer comprising a polyisobutylene midblock and endblocks comprising an interpolymer which includes both polymerized diene segments and polymerized isobutylene segments, wherein the ratio of weight average molecular weight to number average molecular weight of said midblock is no more than about 1.5.

DETAILED DESCRIPTION OF THE INVENTION

Thermoplastic elastomers comprising block copolymers with elastomeric polyisobutylene blocks are extremely useful materials as a consequence of the fact that they exhibit a unique combination of properties including a high degree of resistance to penetration by either moisture or gases, together with a high degree of thermal and oxidation stability, such properties being due in part to the unsaturated nature of their midblock segments. The products also exhibit a self-reinforcing characteristic as a result of the fact that the glassy blocks show a phase separation in which the polyisobutylene blocks constitute the continuous phase, while the glassy blocks make up the discrete phase.

In preparing the thermoplastic elastomers of the invention, the midblock portion is prepared by carrying out the polymerization of the isobutylene in the presence of a polymerization initiator complex prepared in a solvent system, using procedures found to minimize decomposition of the active centers of the complex, as well as side reactions which lead to the formation of undesirable products. The initiator complexes employed comprise certain ester and ether compounds, in combination with various Lewis acids. Inasmuch as chain transfer does not occur during the polymerization, molecular weight control can be accomplished merely by adjusting the relative amounts of isobutylene and initiating system present in the reaction mixture. The polymer will continue to grow as long a monomer is available for reaction and the monomer is not prevented from reacting with the growing center of the polymer, for example, by precipitation of the polymer from the reaction mixture due to insolubility of the polymeric product, or by the destruction of the active centers.

While the process described may conveniently be used for the synthesis of midblock polymers having relatively uniform molecular weights of up to 126,000, and higher, it has been found that unless the polymerization is conducted within certain reaction parameters, the initiator complex can undergo chemical decomposition, or the growth of the polymer can be adversely affected by intramolecular alkylation leading to the formation of indanyl end groups which cause undesirable variations in the molecular weights of the polymer molecules produced. Furthermore, the proton expelled during such alkylation can give rise to the creation of further undesirable polymer chains, as the result of protic-type initiation.

A number of factors have been found to be important in suppressing the formation of indanyl rings caused by self-alkylation, the importance of these factors depending upon the type of initiator used. For example, trifunctional ethers and esters are less sensitive to self-alkylation than mono, or di-functional ethers and esters. As used herein "functional group" is meant to refer to the oxygen atom joining two hydrocarbon radicals, in the case of ether compounds, or to the oxygen compound joining the carboxyl portion to a hydrocarbon radical, in the case of the esters. Consequently, tri-functional initiators afford somewhat more latitude with respect to the selection of reaction conditions than do the others.

Factors which must be considered include the temperature of the reactions; the aging of the initiator complex, the latter being related to the order of addition of the reaction mixture components; the polarity of the solvent mixture in which the polymerization is conducted; the presence or absence of water; and the amount of monomer present during the polymerization.

With respect to the temperature of the polymerization, it has been found that in order to produce polymers in which the ratio of weight average molecular weight to number average molecular weight, $\overline{M}_w/\overline{M}_n$, is maintained at about, or below 1.5, a relatively narrow molecular weight distribution, the polymerization should be conducted at a temperature below about $-60°$ C. In the case of the mono and di-functional initiators, a preferred range is from about $-40°$ C. to $-80°$ C., although lower temperatures may be employed if desired. In the case of the higher temperature range, i.e., from about $-40°$ C. to $-60°$ C., it is often necessary to employ a water scavenger in the form of a non-initiating ester such as ethyl acetate, n-propyl acetate, or the like, in order to avoid undesirable polymerizations due to protic initiation.

While not wishing to be bound by the theory, it is believed that the initiator complex ionizes during aging, and that the ionized species reacts rapidly with monomers, as shown in the following:

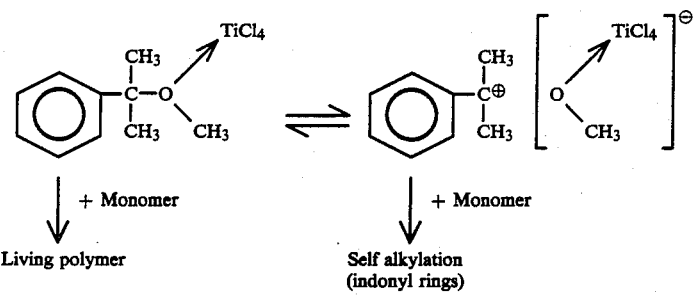

| Living polymer | Self alkylation (indonyl rings) |

In order to minimize the formation of the ionized species, and therefore suppress formation of the undesirable indanyl rings, it has been found desirable to prepare the initiating system in situ in the presence of monomer, thus minimizing the aging period to the extent possible. Curtailment of the aging period is particularly desirable in the case of the more sensitive mono, and di-functional initiator compounds, both the ethers and the esters, although it is also significantly beneficial where the tri-functional initiators are employed at the higher temperature range. It has been determined that the aging period may be desirably minimized by deferring the formation of the complete initiator system until the monomer is present. This may be accomplished, for example, by combining the solvent, the initiator compound, the isobutylene and the water scavenger, and then adding the co-initiator Lewis acid.

While excessive ionization leads to undesirable indanyl-producing side reactions, some ionization of the reaction mixture is required in order for the polymerization to proceed. Consequently, it is necessary to provide a solvent medium having at least some degree of polarity. To achieve the proper degree of polarity, polar solvents such as ethyl chloride, methylene chloride, or similar akyl halogenides are combined with non-polar hydrocarbon solvents in a ratio designed to produce an appropriate polarity in the resulting solvents. To achieve a suitable polarity, it has been found, for example, that the ratio of the non-polar solvent to the polar solvent, on a volume basis, should be from about 80/20 to 50/50. However, the use of a ratio of about 60/40 has been found to provide particularly good results, and the use of this ratio is preferred.

Self-alkylation and the resulting formation of indanyl groups is also minimized by continuing the polymerization in the presence of an excess of isobutylene, until polymer chains of the desired molecular weight have been attained, following which the polymerization is terminated.

As previously indicated, initiator compounds of the type contemplated by the invention comprise both esters and ethers of the mono, di, or tri-functional types. Suitable compounds include cumyl esters of hydrocarbon acids, and alkyl cumyl ethers. Representative initiators, for example, comprise compounds such as 2-acetyl-2-phenyl-propane, i.e., cumyl acetate; 2-propionyl-2-phenyl-propane, i.e., cumyl propinate; 2-methoxy-2-phenyl propane, i.e., cumyl-methyl ether; 1, 4-di(2-methoxy-2-propyl) benzene, i.e., di(cumylmethyl ether); 1,3,5-tri(2-methoxy-2-propyl) benzene, i.e., tri(-cumylmethyl ether); the tri-cumyl halides, particularly the chlorides, i.e., 2-chloryl-phenyl propane, i.e., cumylchloride; 1,4-di(2-chloryl-2-propyl)) benzene, i.e., di(cumylchloride); 1,3,5-tri(2-chloryl-2-propyl) benzene, i.e., tri(cumylchloride), and similar compounds.

Among the preceding, the polyfunctional compounds are particularly preferred.

Any of various Lewis acids may be used as co-initiators to form the initiating complex; however, some compounds are preferred over others For example, the aluminum and tin chlorides function indifferently, if at all in the process of the invention, while titanium tetrachloride produces exceptional results, and the latter compound is, therefore, especially preferred.

The ratio of the initiator compounds to the co-initiator Lewis acid will vary, depending upon the sensitivity of the initiator to the self-alkylation reaction; however, on a molar basis, the ratio of the initiator to the co-initiator will normally be in the range of from about 2 to 1 to about 50 to 1. A range of about 2 to 1, to about 16 to 1 constitutes a preferred embodiment of the invention, with the 2 to 1 ratio ordinarily being used in the case of initiators such as the mono, and di-ethers and esters. Generally, the greater the amount of Lewis acid used relative to the initiator compound present, the more reactive will be the initiator complex, and the greater the probability that undesirable self-alkylations will occur.

Suitable non-polar solvents will include the normal, branch chain, or cyclic hydrocarbons, or mixtures thereof. Such compounds include for instance, n-hexane, n-pentane, n-heptane, benzene, cyclohexane, isopentane, and others. Appropriate polar solvents include halogenated normal, branched chain, or cyclic hydrocarbons, including such compounds as ethyl chloride, methylene chloride, n-butyl chloride, chlorobenzene, an others.

After preparation of polyisobutylene dications of the desired molecular weight, a diene, preferably a conjugated diene, of the general formula

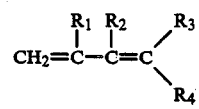

in which $R_1$ is selected from the hydrocarbyl group containing 1 to 12 carbon atoms, and $R_2$, $R_3$, and $R_4$, are selected from hydrogen or a hydrocarbyl group containing from 1 to 12 carbon atoms, is added and copolymerized to form a block copolymer. Such compounds can include those capable of producing cyclized blocks such as, for instance, 1-methyl-1,3-butadiene; 2,3-dimethyl-1,3-butadiene; 2,3-diethyl-1,3-butadiene; 2,3-di-n-propyl-1,3-butadiene; 2-methyl-3-isopropyl-1,3-butadiene; 2 methyl-3-ethyl-1,3-butadiene; 2-phenyl-1,3-butadiene; 3-methyl-1,3-pentadiene; 2-ethyl-1,3-butadiene; 2-methyl-1,3-hexadiene; 3-methyl-1,3-heptadiene;

3-butyl-1,3-octadiene, isoprene, and the like. Special advantages are obtained with isoprene, however, and its use is, therefore, preferred.

Formation of the endblocks on the polyisobutylene commences immediately upon addition of the diene to the reaction mixture containing the polyisobutylene dications. In cases where isoprene is employed, the block copolymer initially formed contains relatively short trans-1,4-polyisoprene "triblock" cations, that is, essentially linear polymer chains. Extended reaction times, however, result in the formation of "multiblock" dications as the result of alkylation and partial cyclization of the polyisoprene segments. As a consequence of this intermolecular reaction, the polyisoprene groups remain the outer segments of the multiblocks. The extent of the intermolecular reaction and cyclization can be regulated by the viscosity of the reaction mixture, which depends in part upon the molecular weight of the polyisoprene midblock. By terminating the reaction in its early stages, prior to the time significant alkylation and cyclization occurs, substantially pure triblock polymers can be obtained. As the reaction is allowed to proceed, the rate of incorporation of the isoprene tends to decrease, probably due to the formation of complexes between the Lewis acid and the isoprene. In such cases, if desired, the polymerization can be accelerated by adding additional Lewis acid to the system. In any event, when the product desired has been achieved, the reaction can be terminated, for example, by adding a nucleophilic terminating agent such as methanol, ethanol, pyridine, ammonia, an alkyl amine, or water.

The products described in the preceding, i.e., the triblock and multiblock polymers, can subsequently be treated in ways well known to the art so that they have incorporated active segments, for example, epoxy, hydroxy, sulfonate groups, etc. along the endblocks of the polymer chains providing chemical reactivity which enables them to enter into subsequent useful reactions. Alternatively, the materials, particularly the triblock materials, can be used without further treatment, for instance, as co-curing agent for elastomers. Both the triblock and multiblock polymers can be cured by means of conventional vulcanization procedures.

As is normally the case, product molecular weights are determined by reaction times, temperatures, concentrations, the nature of the reactants, and similar factors. Consequently, different reaction conditions will produce different products. Synthesis o the desired reaction product will be achieved, therefore, through monitoring the course of the reaction by examination of reaction mixture samples taken periodically during the reaction, a technique widely employed in the art.

The block copolymers described can also be subjected to further processing to cyclize the diene blocks, for example, the polyisoprene blocks. The cyclization may also be accomplished in situ, or the block copolymer can be removed from the original reaction mixture, redissolved, and then reacted to produce a cyclized product. In the event the cyclization is performed in the original, terminated reaction mixture, it is desirable to first remove the unreacted diene monomer to avoid the possibility of excessive alkylation, for example, of the polyisoprene segments. Such removal can be accomplished by standard techniques, including stripping or equivalent procedures. Following such removal, the reaction mixture will ordinarily be heated to its reflux temperature, and maintained at that point until cyclization has proceeded to the point desired, commonly requiring up to about four hours, depending upon the conditions employed.

Alternatively, the original reaction mixture may be terminated by the addition of the terminating agent as previously described, following which the block copolymer may be removed and redissolved in a suitable solvent. A cyclization catalyst, for instance, a Lewis acid, is thereafter added, and the mixture is heated to its reflux temperature, with the cyclization reaction thus initiated being continued to the desired point, again a technique well known in the art. The cyclized polymers are readily crosslinked by the addition of various crosslinker compounds of the type well known in the art, and subsequent exposure to high energy beams such as UV or electron beams.

The properties of the block copolymers contemplated by the invention will depend upon the relative lengths of the polyisobutylene block portion, as well as the amount and nature of the polydiene blocks. While the properties can be widely varied, it has been found that the triblock polymer will contain endblocks constituting about 6% to 8%, on a weight basis, of the total weight of the block copolymer, while multiblock copolymers will contain about 15% to 30% of the polydiene blocks containing partially cyclized segments. The elastomeric properties of the block copolymer will depend upon the length of the midblock chain, with a molecular weight of from about 10,000 to about 30,000 tending to produce a tough, rather inelastic product. On the other hand, when the midblock portion approaches a molecular weight of $\overline{M}_n$ 50,000 and above, the product will exhibit more rubbery characteristics. The cyclized isoprene segments of the block copolymers described will typically exhibit a glass transition temperature of around 170° C., which is sufficiently high to allow them to be used in a wide variety of applications involving elevated temperatures.

A variation of the block copolymers described above involves the formation of the endblocks of the copolymer from a mixture of isobutylene, together with a diene such as isoprene. The product is formed in a manner identical with the techniques described in the preceding, with the exception, however, that the mixture of the isobutylene with the diene is added to the reaction mixture after formation of the polyisobutylene midblock dication, so that a random interpolymer of the latter two materials in varying proportions constitutes the endblocks. Such products are especially useful as co-vulcanizing agents for elastomers.

The block copolymers described in the preceding may be recovered from their reaction mixtures by any of the usual techniques including hot water coagulation in a stirred vessel, or by precipitation with a non-solvent such as an alcohol or alcohol/acetone mixture, followed by drying.

While not intended to be limiting in nature, the following examples are illustrative of the invention.

EXAMPLE 1

A 250 ml round bottom flask equipped with a stirrer is charged with 90 mls of n-hexane, 60 mls of methylchloride, and 0.166 gm of di-cumyl ether having a concentration of about $3 \times 10^{-3}$ mole per liter. After cooling to $-80°$ C., 6 mls of prechilled isobutylene are added, followed by 1.32 mls, $1.20 \times 10^{-2}$ mole, of titanium tetrachloride. The polymerization thus initiated is allowed to continue for fifteen minutes, at which time an additional 6 mls of isobutylene are added. The polymerization is then continued for an additional fifteen minutes, at which point a withdrawn sample of the mixture shows a number average molecular weight of 12,000 and $\overline{M}_w/\overline{M}_n = 1.45$, 12 mls of isoprene are then introduced to the reaction mixture, and the polymerization is allowed to proceed for another thirty minutes before being terminated by the addition of methanol. 12 gms of polymer are thus formed and the isoprene content is determined to be 25 mole percent, 29 weight percent. The product is found to have a definite multi-block character by gel permeation chromatography. Proton nuclear magnetic resonance, 'H NMR shows 14.5 mole percent unsaturation, indicating the loss of 48% of unsaturation, due to cyclization. Post-cyclization of the polyisoprene endblock is then carried out by dissolving 9.5 gms of the polymer in 300 mls of cyclohexane at 80° C., after which 1 ml of boron triflouride etherate is added, initiating the cyclization reaction which is continued for four hours. The cyclized product is then precipitated in methanol and dried. Subsequent examination indicates a residual unsaturation of about 11 mole percent. The product is then dissolved in xylene, and sample films are cast for examination. Physical testing of the film shows it to have a tensile strength at break, sigma, of 32 kg per cm$^2$, and the films elongation, episilon, is found to be 250%. Testing in a differential scanning calorimeter shows a glass transition temperature, $T_g$, of $-73°$ C., the polyisobutylene midblock portion, and two Tg's, 110° C., and 180° C., for the partially cyclized polyisoprene blocks.

EXAMPLE 2

With equipment and a procedure like that of the preceding example, 90 mls of n-hexane, 60 mls of methylchloride, and 0.087 gm, $3.9 \times 10^{-4}$ mole, of di-cumyl ether are combined and cooled to about $-80°$ C. 6 mls of rechilled isobutylene, and 0.66 ml, $6 \times 10^{-3}$ mole of titanium tetrachloride are then added, initiating the polymerization which is continued for fifteen minutes. Thereafter, at fifteen minute intervals, four additional portions of 6 mls of isobutylene are added. At this point a sample is withdrawn for examination, 24 mls of isoprene are added, and the reaction is continued for an additional thirty minutes. Following termination with methanol, 18.4 gms of polymer are found to have been produced, which subsequent examination shows to have a polyisobutylene midblock with a $\overline{M}_n$ of 71,500 and an $\overline{M}_w/\overline{M}_n$ of 1.17, while the $\overline{M}_n$ of the block copolymer is 80,800 and the dispersity is 1.26. The block copolymer is basically an essentially pure triblock polymer, having a trans 1,4 polyisoprene content of 5.0 mole percent, and a $\overline{M}_w/\overline{M}_n$ of 1.26. The unsaturation of the block copolymer, determined by 'H NMR, is 4.8 mole percent, and the loss of unsaturation due to cyclization during the polymerization is found to be negligible. Postcyclization of the polymer is then carried out by dissolving 10 gms of the product in 200 mls of boiling cyclohexane, to which 0.5 ml of titanium tetrachloride has been added. After 4 hours, cyclization is stopped by the addition of methanol, and the polymer is precipated in methanol. 'H NMR analysis of a dried sample shows essentially no unsaturation left. Differential Scanning Calorimetry analysis of the polymer indicates two Tg's, $-73°$ C. for the polyisobutylene block, and 170°–180° C. for the cyclized polyisoprene block.

EXAMPLE 3

A polymerization is conducted in the manner of the preceding examples by adding 90 mls of n-hexane, 60 mls of methylchloride, and 0.087 gm, $3.8 \times 10^{-4}$ mole, of di-cumyl ether. After cooling the solution to $-90°$ C., 6 mls of prechilled isobutylene, plus 0.66 ml of titanium tetrachloride are added to the mixture, and the reaction thus initiated is allowed to continue for fifteen minutes. Four additional 6 mls portions of isobutylene are then added at fifteen minute intervals. Subsequently, 24 mls of isoprene are added, and the reaction is terminated with methanol after a further reaction period of thirty minutes. The resulting polymer yield is 18.6 gms, and examination shows the polyisobutylene midblock to have a $\overline{M}_n$ of 68,500, a $\overline{M}_w/\overline{M}_n$ of 1.13, while the $\overline{M}_n$ of the thermoplastic elastomeric block copolymer is 80,800, and its $\overline{M}_w/\overline{M}_n$ equals 1.26. The copolymer is found to contain 5.8 mole percent of trans 1,4 polyisoprene. The unsaturation of the polymer by proton 'H NMR is 5.4 mole percent, and 7 mole percent of the initial unsaturation is found to have been cyclized. In a post-cyclization procedure, 10 gms of the product are dissolved in 200 ml of cyclohexane maintained at 80° C., and 1 ml of boron triflouride etherate is added, initiating the cyclization reaction. After four hours, only three mole percent of unsaturation is found to remain. The product is basically a linear pure triblock material.

EXAMPLE 4

In an additional experiment conducted at $-80°$ C., 135 mls of n-hexane are combined with 0.161 gm of di-cumyl ether, and 90 mls of methylchloride 10 mls of isobutylene and 1.32 mls of titanium tetrachloride are then added to initiate the reaction, which is continued for fifteen minutes before an additional 10 mls of isobutylene are introduced and the reaction continued for a further fifteen minutes. 4.8 mls of 2,4-dmethyl-13-pentadiene, DMPD, are then added and allowed to react for thirty minutes, after which the polymerization is terminated with methanol. The yield is 17.6 gms, and the polyisobutylene portion of the polymer shows a $\overline{M}_n$ of 26,200, and an $\overline{M}_w/\overline{M}_n$ of 1.2, while the block copolymer itself exhibits an $\overline{M}_n$ of 33,600, and 9.6 mole percent of the DMPD. Unsaturation is shown by 'H NMR to be 7.3 mole percent, with 24% of the initial unsaturation having been lost due to cyclization. The polymer shows incorporation of the DMPD in the trans-1,4 configuration. Gel permeation chromotography indicates the presence of about 25% of a pentablock structure, the balance being in a triblock configuration.

EXAMPLE 5

A linear triblock with endblocks comprised of random isobutylene/polyisoprene segments is prepared by charging a 250 mls, three necked flask with $5.9 \times 10^{-4}$ mole of di-cumyl methyl ether, 90 mls of hexane, and 60 mls of methylchloride. After being cooled to $-80°$ C., 6 mls of prechilled isobutylene, are added, and the polymerization is begun by the addition of 1.32 mls of titanium tetrachloride and 5 mls of hexane. After 15 minutes, an additional 6 mls of isobutylene are added, followed by two additional 6 mls portions of isobutylene introduced at fifteen minute intervals. Fifteen minutes after the last such addition, 24 mls of a 50/50, by volume, mixture of isobutylene/isoprene are added, and the reaction is continued for forty-five minutes before being stopped by the introduction of methanol. The yield obtained is 20.4 gms of a triblock polymer containing a polyisobutylene middle segment, and a mixed polyisobutylene/polyisoprene copolymer endblock. The polyisobutylene segment shows an $\overline{M}_n$ of 30,800, and a $\overline{M}_w/\overline{M}_n$ of 1.16. The $\overline{M}_n$ of the block copolymer is 33,900, and the $\overline{M}_w/\overline{M}_n$ is 1.14. The polyisoprene content of the copolymer is 2.5 mole percent, the endblocks containing 7.5 unit of isoprene in each end. The product is a type suitable for use as a starting material in synthesizing polymers having functional groups attached to their endblocks, by methods known to the art. Further these types of block copolymers are readily vulcanizable with conventional sulfur curing recipes, or covulcanization of such block copolymers may be carried out in blends with other sulfur vulcanizable rubbers.

EXAMPLE 6

A multiblock polymer is formed from polyisobutylene and 2-methyl-1,3-pentadiene (MPD) at $-80°$ C. by combining 90 mls of n-hexane with 60 mls of methylene chloride, and 0.161 gm of di-cumyl ether. 10 mls of isobutylene and 1.32 mls of titanium tetrachloride are then introduced, initiating the polymerization, which is continued for fifteen minutes. At that point, three 10 mls portions of isobutylene are added at fifteen minute intervals, before 24 mls of MPD are finally added. Following thirty more minutes of polymerization, the reaction is terminated by the addition of methanol, yielding 39.1 gms of a multiblock polymer. The polyisobutylene midblock of the copolymer produced shows an $\overline{M}_n$ of 34,900, an $\overline{M}_w/\overline{M}_n$ of 1.28, while the copolymer itself is shown to have an $\overline{M}_n$ of 51,100, and 35.7 mole percent of the MPD contained therein.

EXAMPLE 7

A multiblock polymer is produced by adding 180 mls of n-hexane to 0.4266 gm of di-cumyl ether, and 120 mls of methyl chloride. 10 mls of isobutylene and 3.5 mls of titanium tetrachloride are then added to begin the reaction, which is continued for fifteen minutes before two additional 10 mls portions of isobutylene are added, fifteen minutes apart. After a further fifteen minutes of reaction, 48 mls of isoprene are introduced and reacted for thirty minutes before the reaction is terminated with methanol. 32.8 gms of multiblock polymer are produced in which the polyisobutylene midblock has a $\overline{M}_n$ of 16,600 and a $\overline{M}_w/\overline{M}_n$ of 1.36. The copolymer has a polyisoprene content of 29.2 mole percent, (33 weight percent) and shows unsaturation by —H NMR of 20 mole percent, with a loss of unsaturation due to cyclization of 32%. The film cast from carbon tetrachloride exhibits a tensile strength at break of 35 kg/cm$^2$, and an elongation of 250%.

EXAMPLE 8

A multiblock polymer is produced at $-90°$ C. by combining 180 mls of n-hexane, 120 mls of methylchloride, and 0.5026 gm of dicumyl ether. 10 mls of isobutylene, and 3.5 mls of titanium tetrachloride are added to initiate the reaction, which is continued for fifteen minutes before two additional 10 mls portions of isobutylene are added, fifteen minutes apart. After a final fifteen minutes of reaction, 24 mls of isoprene are added and reacted for fifteen minutes, at which point the reaction is terminated by the addition of methanol. The yield is 29.4 gms of a multiblock product exhibiting an $\overline{M}_n$ of the polyisobutylene midblock of 9,500 and a $\overline{M}_w/\overline{M}_n$ of 1.35, while the block copolymer is shown to have 26 mole percent of partially cyclized polyisoprene and to have about 18 mole percent unsaturation.

EXAMPLE 9

A linear triblock is produced by combining 90 mls of hexane with 0.089 gm of dicumyl ether, and 60 mls of methyl chloride. After cooling to about $-80°$ C., 6 mls of prechilled isobutylene, and 0.66 ml of titanium tetrachloride are introduced and reacted for fifteen minutes. Thereafter, additional 6 mls portions of isobutylene are added at fifteen minute intervals. The last of these is allowed to react for fifteen minutes before 24 mls of isoprene are added, reacted for thirty minutes, and the polymerization terminated by the addition of methanol. The yield is 22.6 gms; the midblock polyisobutylene portion has $\overline{M}_n$ of 51,300 and a $\overline{M}_w/\overline{M}_n$ of 1.17, while the copolymer is shown to contain 3.7 mole percent of trans-1,4 polyisoprene. The copolymer has about 3.8 to 4 mole percent of unsaturation, and substantially no cyclization of the end groups can be seen to have occurred. The $\overline{M}_n$ of the final product is 53,800, and the $\overline{M}_w/\overline{M}_n$ is 1.21.

EXAMPLE 10

In a further experiment, conducted at a temperature of $-80°$ C., 90 mls of n-hexane are added to 0.089 gm of dicumyl ether, and 60 mls of methylene chloride. The reaction is begun by the addition of 6 mls of isobutylene and 0.66 ml of titanium tetrachloride. After fifteen minutes, five additional portions of 6 mls each of isobutylene are added at fifteen minute intervals, the last being allowed to react for fifteen minutes before 24 mls of isoprene are added. After a reaction time of thirty minutes, an additional 0.66 ml of titanium tetrachloride is added, and the polymerization is continued for thirty more minutes before being terminated with methanol. The yield is 23.6 gms of a copolymer which has a polyisobutylene midblock $\overline{M}_n$ of 53,400 and an $\overline{M}_w/\overline{M}_n$ of 1.18. The copolymer shows 7.1 mole percent content of polyisoprene, and an unsaturation of about 5.5 mole percent. The loss of unsaturation is 35%.

In a similar, additional experiment, a further 0.66 ml of titanium tetrachloride is added after the second such addition, producing gelation.

EXAMPLE 11

A cyclized multiblock polymer is produced by combining 90 mls of hexane with 60 mls of methylene chloride and 0.089 gm of dicumyl ether. The reaction is begun by adding 6 mls of isobutylene and 0.66 ml of titanium tetrachloride. After fifteen minutes, five additional 6 mls portions of isobutylene are added at fifteen minute intervals. Fifteen minutes after the last such addition, 24 mls of isoprene are added, and the reaction continued for five hours and thirty minutes before methanol is added to stop the reaction. The yield is 28.2 gms having a polyisobutylene midblock portion with an $\overline{M}_n$ of 55,500 and a $\overline{M}_w/\overline{M}_n$ of 1.16. The copolymer shows a polyisoprene content of 20.1 mole percent, and 10% unsaturation by —H NMR, indicating a 50% loss of unsaturation. 10 gms of the polymer are then dissolved in 200 mls of cyclohexane maintained at reflux temperature under nitrogen, and 0.5 ml of titanium tetrachloride is added. After 4 hours, the cyclized polymer is found to contain 8 mole % unsaturation, and after 20 hours, 6 mole %. Approximately 50% of the unsaturation has been lost during the course of the reaction. In a post-cyclization, 10 gms of the polymer is dissolved in 200 mls of cyclo-hexane at 80° C., and 0.5 ml of titanium tetrachloride is added. The reaction is continued for four hours, at which time 'H NMR reveals the amount of unsaturation present to be 8 mole percent. When the reaction is continued for twenty hours, the amount of unsaturation drops to 6 mole percent. A film of the product formed from toluene shows a tensile strength at break of 20 kg/cm$^2$, and an elongation of 1,000%.

EXAMPLE 12

In another experiment, a multiblock, postcyclized polymer is formed showing good thermoplastic elastomeric properties by adding 90 mls of n-hexane to 60 mls of methylene chloride, and 0.089 gm of dicumyl ether. The polymerization is commenced by the addition of 6 mls of isobutylene, and 0.66 ml of titanium tetrachloride. The reaction thus initiated is continued for fifteen minutes, at which time five additional portions of isobutylene of 6 mls each are added at fifteen minute intervals. Fifteen minutes after the last such addition, 0.66 ml of titanium tetrachloride is added, as well as 24 mls of isoprene. The reaction is continued for two hours and thirty minutes before being terminated with methanol. The yield is 26 gms of a polymer whose polyisobutylene elastomeric blocks $\overline{M}_n$ is 53,900 with an $\overline{M}_w/\overline{M}_n$ of 1.17, and whose partially cyclized polyisoprene content is 14.4 mole percent. The unsaturation of the copolymer is shown by —H NMR to be 9.2 mole percent, and 36% of the initial unsaturation of the polymer is seen to have been lost. In a post-cyclization reaction, 24 gms of the block copolymer are added to 1000 mls of cyclohexane, with the mixture being refluxed in the presence of 1 ml of titanium tetrachloride and 0.4 gm of trifluoroacetic acid for twenty hours. The procedure produces a product having 3% of unsaturation, and a film cast from carbon tetrachloride tested before, and after aging shows the tensile strength to have increased over time. After 34 days a 100 kg/cm$^2$ tensile strength is found at 1200% ultimate elongation. The film remains soluble in boiling xylene, and meltable and shapable at about 170° C., indicating a thermoplastic-elastomeric character.

EXAMPLE 13

In a further experiment, 2 gms of a post-cyclized block copolymer with polyisobutylene elastomeric, and partially cyclized polyisoprene blocks is cross-linked by ultraviolet radiation under an ultraviolet curing apparatus set at 300 watts per inch. The polyisobutylene blocks of the copolymer thus treated have a $\overline{M}_n$ of 18,800, and an $\overline{M}_w/\overline{M}_n$ of 18, while the partially cyclized polyisoprene content of the block copolymer is 23 mole percent. The unsaturation of the block copolymer after cyclization is 9.9 mole percent, and the polymer sample was dissolved in 20 mls of carbon tetrachloride to form a 10%, by weight solution. Approximately 0.15 gm of 2,6-bis(4-azidobenzilidene)-4 methyl cyclohexanone, dissolved in 2 mls of dichloromethane are added to the solution thus formed, after which the solution is poured into aluminum dishes and dried. Following irradiation as previously described, the aluminum dishes are dissolved in concentrated aqueous potassium hydroxide solution to yield a film for testing. The existence of cross-linking is established by the fact that the films do not dissolve in xylene, tetrahydrofuran, or toluene. Physical properties of the film include a tensile strength at break of 45 kg/cm$^2$, and an elongation of 450%. In addition to being a good photocurable material, the film is not brittle, due to the rubbery polyisobutylene segments.

EXAMPLE 14

In another experiment, 6 gms of a block copolymer consisting of polyisobutylene elastomeric blocks, and partially cyclized polyisoprene blocks are irradiated for 60 seconds with ultraviolet light, as described in the preceding example. The block copolymer has a partially cyclized polyisoprene content of 17 mole percent, and exhibits unsaturation after cyclization of 10.2 mole percent. The block copolymer is dissolved in 54 mls of carbon tetrachloride, and 0.2 gm of 2,6-bis(4-azidobenzilidene)-4-methyl cyclo-hexanone dissolved in 2 mls of methyl dichloride is added to the polymer solution. The mixture is poured into aluminum dishes, as in the case of Example 13. Following irradiation, the pliant, photocured films are only partially dissolvable in boiling xylene, indicating partial cross-linking.

EXAMPLE 15

In another experiment, 15 gms of a multiblock block copolymer having polyisobutylene elastomeric blocks with an $\overline{M}_n$ of 9,500, and a $\overline{M}_w/\overline{M}_n$ of 1.35, with a partially cyclized polyisoprene content of 26 mole percent, 30% cyclized, are dissolved in 100 mls of boiling xylene, following which 100 mls of chloroform are added to the solution. The polymer solution thus obtained is added drop-wise to 8 gms of 3-chloroperbenzoic acid dissolved in 150 mls of chloroform at room temperature. Two hours of reaction time are provided, after which the product is purified and dried to yield 10 gms of an epoxidized multiblock product. 'H NMR study shows that all unsaturation in the original multiblock material has disappeared, indicating complete expoxidation.

Photocuring is carried out with 5%, by weight, of a Crivello salt, i.e.,

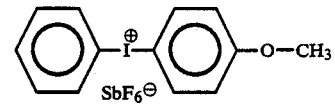

and 5 weight percent of 2,2-di-methoxy-2-phenylacetophenone, a photo-sensitizer, are added to the expoxidized multiblock material dissolved in carbon tetrachloride to provide a 10%, by weight, polymer solution. The mixture is poured into aluminum dishes, dried, and irradiated for 60 seconds, as previously described. The aluminum dish is then dissolved in potassium hydroxide, and the polymer is dried and heated at 55° C. for twenty-four hours. The product obtained is light brown and cross-linked, as indicated by the fact that it does not dissolve either in tetrahydrofuran or boiling xylene. The product exhibits a tensile strength at break of 45 kg/cm$^2$, and an elongation of 450%.

Amine-curing of the epoxidized multiblock is carried out as follows: The epoxidized multiblock is dissolved in carbon tetrachloride to form a 10%, by weight, solution; sufficient moles of diethylene tetramine are added to equal the moles of epoxy groups present in the polymer, and a drop of p-toluene-sulfonic acid is added as a catalyst. The solution is thereafter poured into a teflon mold, dried and maintained at 55° C. for three days. The procedure results in a yellow, rubbery, cross-linked sheet, as shown by the fact that it fails to dissolve in tetrahydrofuran or boiling toluene.

EXAMPLE 16

In an additional example, 8 gms of a linear triblock copolymer comprising a polyisobutylene midblock having an $\overline{M}_n$ of 30,800, a $\overline{M}_w/\overline{M}_n$ of 1.16, and random polyisoprene/polyisobutylene endblocks, are dissolved in 100 mls of tetrahydrofuran. The $\overline{M}_n$ of the triblock is 33,900, the $\overline{M}_w/\overline{M}_n$ is 1.14, and the polyisoprene content is 2.6 mole percent. The tetrahydrofuran is added dropwise to 40 mls of 9-borobicylononane in 100 mls tetrahydrofuran. The mixture is stirred at 0|C for six hours and then oxidized in a caustic media with hydrogen peroxide. The resulting product is washed, and dried, yielding 5 gms of a hydroxy-containing multiblock polymer. Examination discloses no residual unsaturation, and IR spectra confirms the presence of OH groups in the polymer to the extent of $4.57 \times 10^{-4}$ OH groups/gram of triblock copolymer.

EXAMPLE 17

In another experiment, 0.1756 gm of dicumyl ether, $7.9 \times 10^{-4}$ mole, is added to 120 mls of hexane, 80 mls of methyl chloride, and 10 mls of isobutylene in a 250 ml round bottom flask maintained at $-80°$ C. The polymerization reaction is started by the addition of 1 ml of titanium tetrachloride. After 15 minutes, an additional 5 mls of isobutylene are added, and the reaction continued for a further 15 minutes. A sample is then withdrawn, 36 mls of isoprene are added, and the reaction continued for another 40 minutes before being terminated by the addition of methanol. Analysis of the sample shows an isoprene content of 23 mole percent, 19 mole percent of which has been transferred into cyclic units during the synthesis. Gel permeation chromotography of the Y polyisobutylene sample shows a $\overline{M}_n$ of 18,800, and a $\overline{M}_w/\overline{M}_n$ of 1.15. GPC analysis of the final product shows a polymer having a multiblock character, i.e., the simultaneous presense of triblock, pentablock, and small amounts of multiblock constituents. 14 gms of the product are post-cyclized by dissolving the product in 300 mls of cyclohexane and subsequently heating the mixture to its reflux temperature under a dry nitrogen blanket in the presence of 0.7 gm trichloroacetic acid and 0.3 ml of titanium tetrachloride. The cyclization reaction is continued for 24 hours before being stopped by the slow addition of methanol. Thereafter, the polymeric product is precipitated in methanol. 'H NMR analysis of the product shows 12 mole percent unsaturation. A film cast from carbon tetrachloride indicates a 47 kg/cm² tensile strength at break at 460% elongation. The cast film remains soluble in boiling xylene and is easily melted at elevated temperatures, indicating a thermoplastic elastomeric character.

EXAMPLE 18

In a further experiment, 0.1602 gm, $2.72 \times 10^{-4}$ mole, of 1,3,5-tris(2-methoxy-2-propyl)-benzene, tricumyl ether, is added to 90 mls of hexane, and 60 mls of methylchloride. 6 mls of isobutylene and 0.66 ml of titanium tetrachloride are introduced, initiating the reaction. After 15 minutes, 6 mls portions of isobutylene are added 5 times, at 15 minute intervals. 15 minutes after the last addition, 24 mls of isoprene are added, and the reaction continued for an additional 60 minutes. The reaction is then terminated by the addition of methanol. Analysis of the product shows that the "star-shaped" polyisobutylene has a number average molecular weight o 67,300, and an $\overline{M}_w/\overline{M}_n$ of 1.27. The block copolymer has a number average molecular weight of 82,800, and a $\overline{M}_w/\overline{M}_n$ of 1.75. The isoprene content of the block copolymer is nine mole percent.

Another useful embodiment of this invention comprises vulcanizable new elastomeric compositions which contain partially cyclized blocks derived from a conjugated diene such as isoprene, and elastomeric polyisobutylene blocks of desired length. For instance, according to the polymerization techniques described in this invention, branchy multiblocks containing partially cyclized polyisoprene blocks, and fully saturated polyisobutylene soft blocks are readily obtained. These multiblock copolymers are sulfur vulcanizable by conventional methods. During vulcanization, the residual double bonds in the partially cyclized polyisoprene blocks participate in crosslinking reactions. Thus, the cyclized polyisoprene sequences of the multiblock copolymers become a part of the vulcanizate network interlinked with fully saturated soft polyisobutylene sequences, thereby providing novel properties to the resulting vulcanizates. Vulcanization of such cyclized elastomers may also be carried out in blends with other rubbers.

While in accordance with the patent statutes, a preferred embodiment and best mode has been presented, the scope of the invention is not limited thereto, but rather is measured by the scope of the attached claims.

What is claimed is:

1. A block copolymer comprising a polyisobutylene midblock and polymerized diene endblocks, or a multiblock copolymer comprising a polyisobutylene elastomeric block flanks by blocks of the polymerized diene containing partially cyclized segments wherein the ratio of weight average molecular weight to number average molecular weight of said midblock is no more than about 1.5, said polymerized diene being cyclized.

2. A block copolymer according to claim 1 wherein said diene is isoprene.

3. A block copolymer comprising a polyisobutylene midblock and polymerized diene endblocks, or a multiblock copolymer comprising a polyisobutylene elastomeric block flanked by blocks of the polymerized diene containing partially cyclized segments wherein the ratio of weight average molecular weight to number average molecular weight of said midblock is no more than about 11.5, said polymerized diene being cyclized and the isobutylene midblock having a molecular weight of $M_n = 50,000$ and above, and the diene being sufficiently cyclized to give the block copolymer a glass transition of about 170° C.

* * * * *